Sept. 30, 1930. W. C. ROBBINS 1,777,129
COUPLING FOR RELATIVELY MOVABLE MEMBERS
Filed Dec. 15, 1927 2 Sheets-Sheet 1
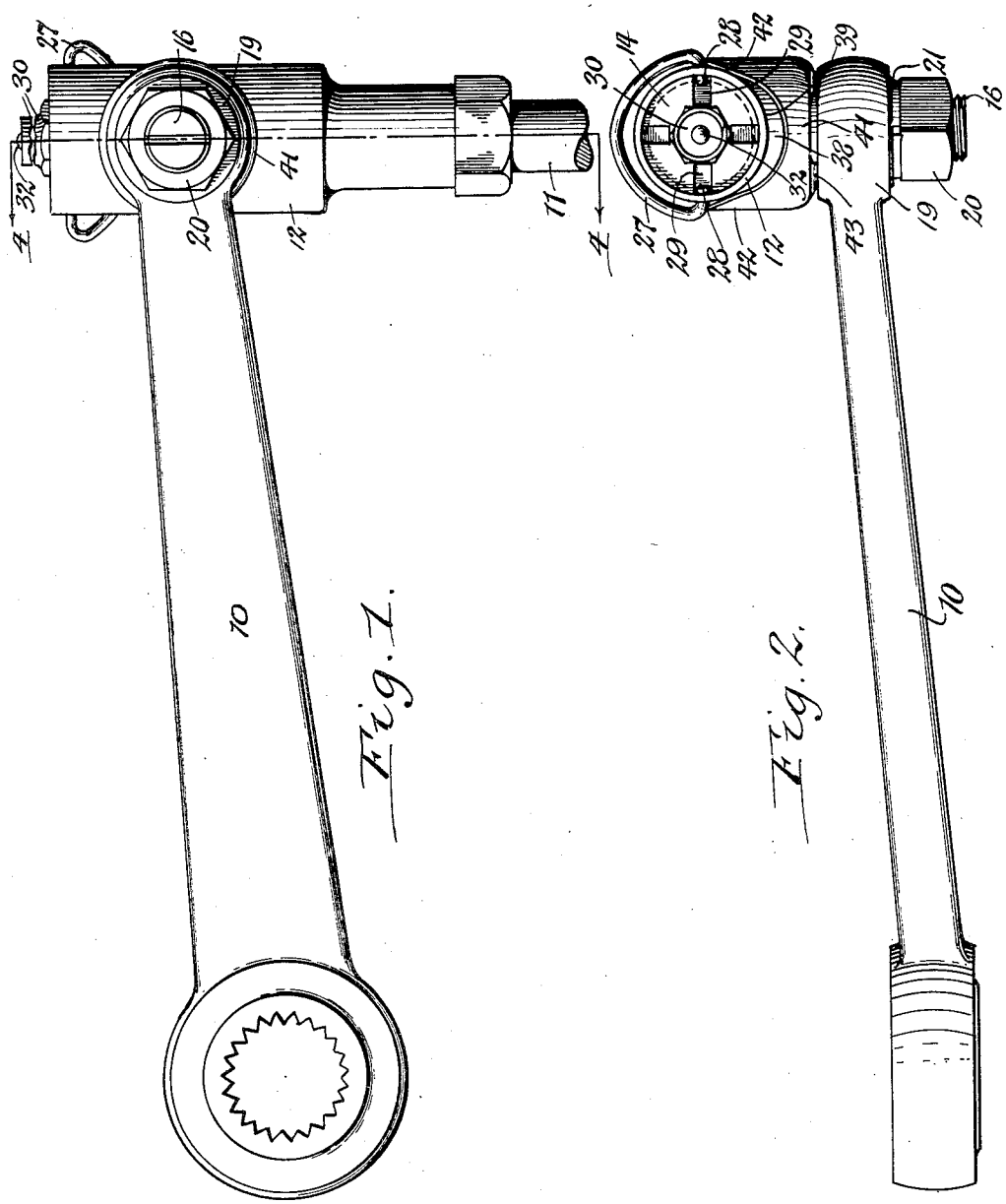
Inventor
Walter C. Robbins
By Papp & Powers
Attorneys Sept. 30, 1930.  W. C. ROBBINS  1,777,129
COUPLING FOR RELATIVELY MOVABLE MEMBERS
Filed Dec. 15, 1927  2 Sheets-Sheet 2
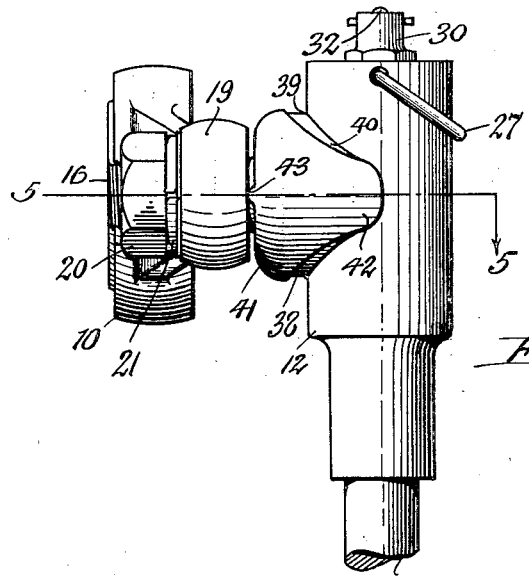
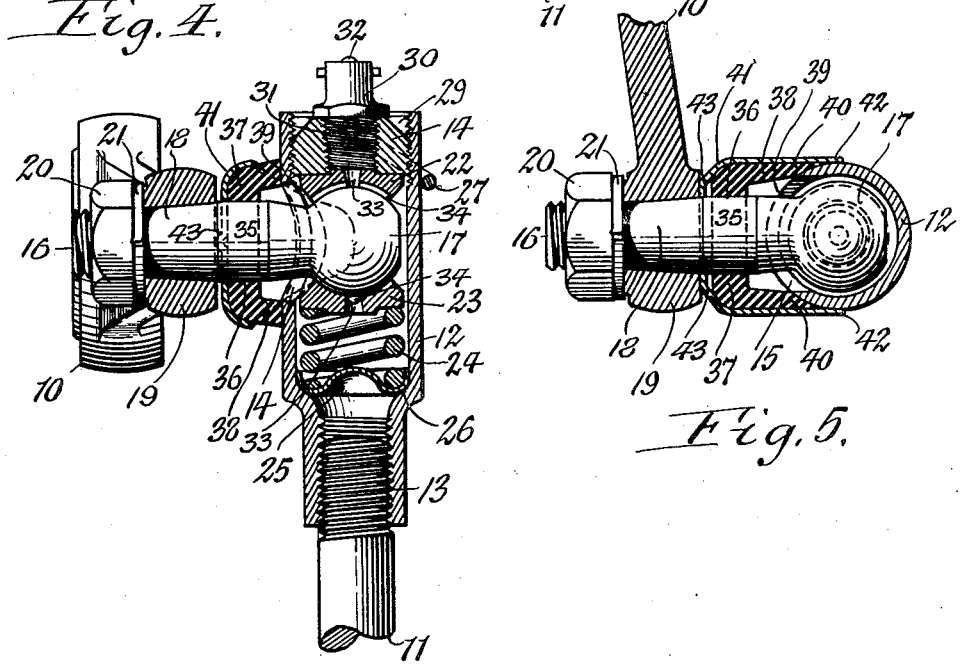
Inventor
Walter C. Robbins
By Popp & Towers
Attorneys Patented Sept. 30, 1930

1,777,129

UNITED STATES PATENT OFFICE

WALTER C. ROBBINS, OF BUFFALO, NEW YORK, ASSIGNOR TO HOUDE ENGINEERING CORPORATION, OF BUFFALO, NEW YORK, A CORPORATION OF NEW YORK

COUPLING FOR RELATIVELY MOVABLE MEMBERS

Application filed December 15, 1927. Serial No. 240,248.

This invention relates to a coupling for relatively movable members and more particularly to a closure, boot or covering for the knuckle joint between the rock arm and drag link of a shock absorber for automobiles or similar installations.

As is well known these joints of shock absorbers are constantly exposed to foreign matter such as dust and dirt, and unless this foreign matter is excluded, the same cannot be properly lubricated resulting in undue wear and noise.

It has been proposed heretofore to protect these joints against the entrance of foreign matter by using leather boots or jackets which were held around these joints by lacing but the same have been found unsatisfactory because the dirt and dust were not effectively excluded from the joints, the lubricant was not confined in the joint, the same also presented an unsightly appearance, they were liable to get out of order and required frequent attention, and the same were difficult and inconvenient to assemble and required frequent attention.

It is the object of this invention to provide a boot or covering for the knuckle joint between the rock arm and drag link of an automobile shock absorber or similar installation which reliably covers the joint between the cooperating bearing surfaces of the arm and link by means which are neat in appearance, simple in construction, easily applied and efficient in operation and which will confine the lubricant in the joint so that it cannot escape, thereby insuring proper working of the joint under all conditions without the necessity of frequent attention.

In the accompanying drawings:

Fig. 1 is a side elevation of a rock arm and drag link of a shock absorber showing the joint between the same protected by a boot or covering embodying my invention.

Fig. 2 is a top plan view of the same.

Fig. 3 is an end elevation thereof.

Fig. 4 is a vertical section taken on line 4—4 of Fig. 1.

Fig. 5 is a horizontal section taken on the correspondingly numbered line in Fig. 3.

Similar characters of reference indicate like parts in the several figures of the drawings.

Although the dust and weather-proof closure forming the subject of this invention is capable of use elsewhere the same is shown in the present case, as an example of a practical application, to the pivotal connection between an arm and a link of the operating mechanism of a hydraulic shock absorber, and it is therefore to be understood that this closure is intended for various purposes where a device of this character is required.

As shown in the drawings the numeral 10 represents the rock arm or lever of a hydraulic shock absorber which is adapted to actuate a piston which exerts pressure on a resistance fluid contained within a chamber mounted on the frame of an automobile. The numeral 11 represents the connecting rod of a drag link which is adapted to be connected at its lower end with an axle of the car. The upper part of this link is constructed in the form of a housing sleeve or tube 12, the lower end of which is connected by a screw joint 13 with the upper end of the rod 11 and the upper end of this sleeve being normally closed by a screw plug or nut 14 and the side thereof being provided with a pivot opening 15.

Extending through this pivot opening is the shank 16 of a neck pin or stud the inner end of which has the form of a ball or spherical knuckle 17 and the outer part 18 being of conical form and engaging with a correspondingly shaped opening in the eye 19 of the rock arm which latter is secured in place thereon by a screw nut 20 arranged on the outer end of the pivot pin and engaging with the outer side of the eye through the medium of a lock washer 21.

Within the housing sleeve is arranged a pair of ball seats 22, 23 the opposing surfaces of which are concave and together form a spherical bearing for the pivot ball the diametrically opposite sides of which engage with the concave faces of the inner and outer ball seats 22, 23, respectively. The outer ball seat 22 engages with the screw plug 14 and the inner ball seat engages with the upper end of a spring 24, the latter being supported at its lower end by a spring seat 25 resting on an internal shoulder 26 within the sleeve. By turning the plug 14 the pressure of the bearing or ball seats against opposite sides of the ball of the pivot pin can be regulated as desired and after such adjustment this screw plug is held against turning by a lock consisting of a bow 27 of spring wire having jaws 28 at its ends which project through the housing sleeve and into engagement with notches 29 in the outer face of said screw plug.

For the purpose of lubricating the spherical bearing surfaces of this pivotal connection various means may be provided, for example, a filling nipple 30 which is secured in an axial opening 31 in the screw plug and which has a spring loaded check valve 32 to permit of introducing a lubricant of either oil or grease form but preventing escape thereof. This lubricant is carried through a duct 33 in the outer bearing seat to the spherical surfaces of the joint. Both ball seats are provided with such a duct and also with a cross groove 34 to permit the lubricant to flow around the pivot stud or pin.

When this joint is in use on an automobile as part of a shock absorbing mechanism the pivot pin and sleeve assume various angular positions relative to each other due to the movement of the axle and frame of the car toward and from each other and the tilting of these members at varying angles in passing over uneven roadways. The pivot opening 15 in the side of the housing sleeve is therefore made sufficiently large to permit of the maximum angular movement of the pivot pin or stud and housing sleeve.

In order to permit of this shifting of the pivot pin of the arm and the housing of the link and still keep the pivot opening covered for the purpose of confining the lubricant within the joint and preventing the entrance of dust or other foreign matter, closure means are provided which embody my invention and which in their preferred form are constructed as follows:

On its central part the pivot pin, neck or stud is provided with a cylindrical face 35 which receives the opening 36 in the disk or head 37 of an elastic cup shaped washer preferably made of rubber. Projecting inwardly from the edge of this head and formed integrally therewith is an annular flange 38 which engages the exterior of the housing 12 and has its edge provided on diametrically opposite sides with notches 39 which receive and engage with the adjacent peripheral part of the housing sleeve and at right angles to these notches this flange is provided with two diametrically opposite ears 40 which straddle and engage with the adjacent outer surface of the housing sleeve.

This elastic washer fits tightly under pressure against said pivot pin and said sleeve around the pivot opening therein so as to form a closure therefor but is capable of yielding so that the arm and link can shift into various angles relative to one another while the same is in action as part of the shock absorber on a car thereby at all times effectively preventing the escape of lubricant from the housing sleeve and the entrance of dust into the same. The ball joint is thus maintained in the most efficient condition inasmuch as loss of lubricant is avoided, undue wear is avoided and frequent replenishing of lubricant is rendered unnecessary.

For the purpose of maintaining the washer in its operative position a holding clip is provided which is preferably constructed of sheet metal and comprises a cap 41 fitting over the head of the washer, two retaining cheeks 42 projecting inwardly from diametrically opposite sides of the cap and engaging the outer sides of the ears on the washer, and fulcrum beads, projections or ribs 43 arranged radially on the cap 41 and projecting outwardly from diametrically opposite sides therefrom into engagement with the opposing inner face of the eye on the rock arm, as shown in Figs. 3, 4 and 5.

As the rock arm and drag link turn relative to each other about the axis of the pivot pin the fulcrum beads slide circumferentially on the opposing face of the rock arm, and when the drag link swings in a plane parallel with the axis of the pivot pin one side of the elastic washer will be compressed and the other side will be permitted to expand and at the same time the washer slides lengthwise on the housing, and during this time the holding or retaining clip rocks by means of its fulcrum beads on the eye of the rock arm. The rubber washer thus operates as a seal or closure for the pivot opening in the sleeve under all conditions and thus positively excludes foreign matter from the bearing surfaces of the ball joint and prevents the loss of the lubricant.

Not only is this boot or closure much simpler in construction than the old style leather boot, but the same is also attractive in appearance and capable of being readily wiped off and kept clean easily.

Owing to the exclusion of dirt or foreign matter from the bearing surfaces of the joint between the arm and the link it is not only possible to maintain a better lubricating condition, but it is also possible for the joint to work satisfactory as an oil-less bearing and thus eliminate the use of special grease fittings.

Although this invention has been shown and described as more particularly suited for use in excluding dust from the ball joint between the rock arm and operating link or rod of a shock absorber it is to be understood that the same can be used to advantage in other installations where similar conditions exist.

I claim as my invention:

The combination of a housing having a side opening, a ball socket arranged within said housing, a ball seated in said socket and having a neck projecting outwardly through the opening in said housing, an arm connected with the outer end of said neck, a cup shaped closure of elastic material which has a perforation receiving said neck and a concave side which is provided with a flange engaging with the exterior of said housing around said opening therein, and a metal cap having a concave side and a convex side and mounted on said neck and receiving in its concave side said closure and provided on its convex side with a projecting fulcrum which engages with said arm and forms a rocking bearing between said cap and arm.

In testimony whereof I hereby affix my signature.

WALTER C. ROBBINS.